June 30, 1959  M. H. KLAUSMANN  2,892,430
MACHINE FOR INSERTING POURING SPOUTS INTO CONTAINERS
Filed Dec. 5, 1955  12 Sheets-Sheet 1
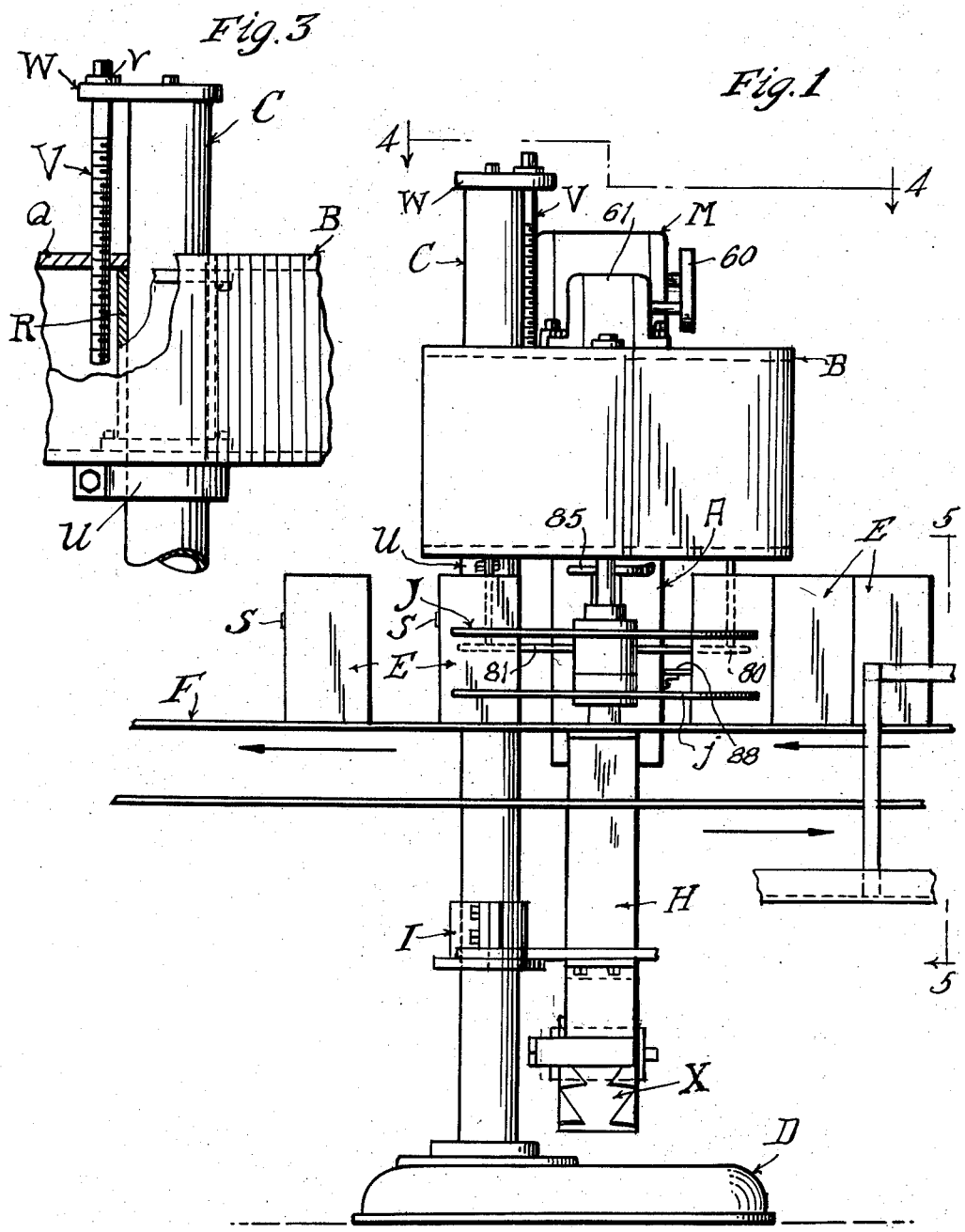
INVENTOR.
Milton H. Klausmann,
BY
Harry B. Rook,
ATTORNEY

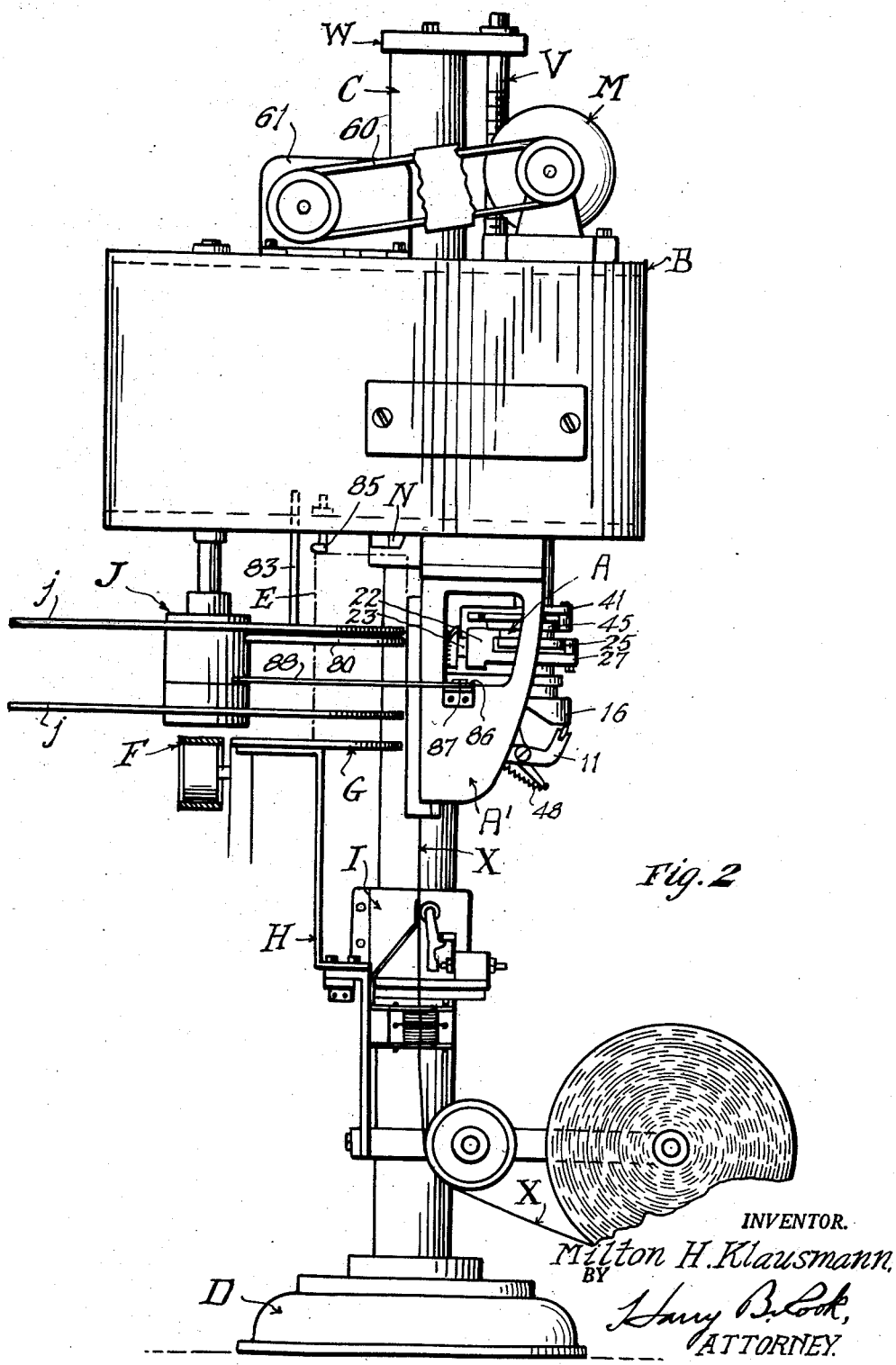

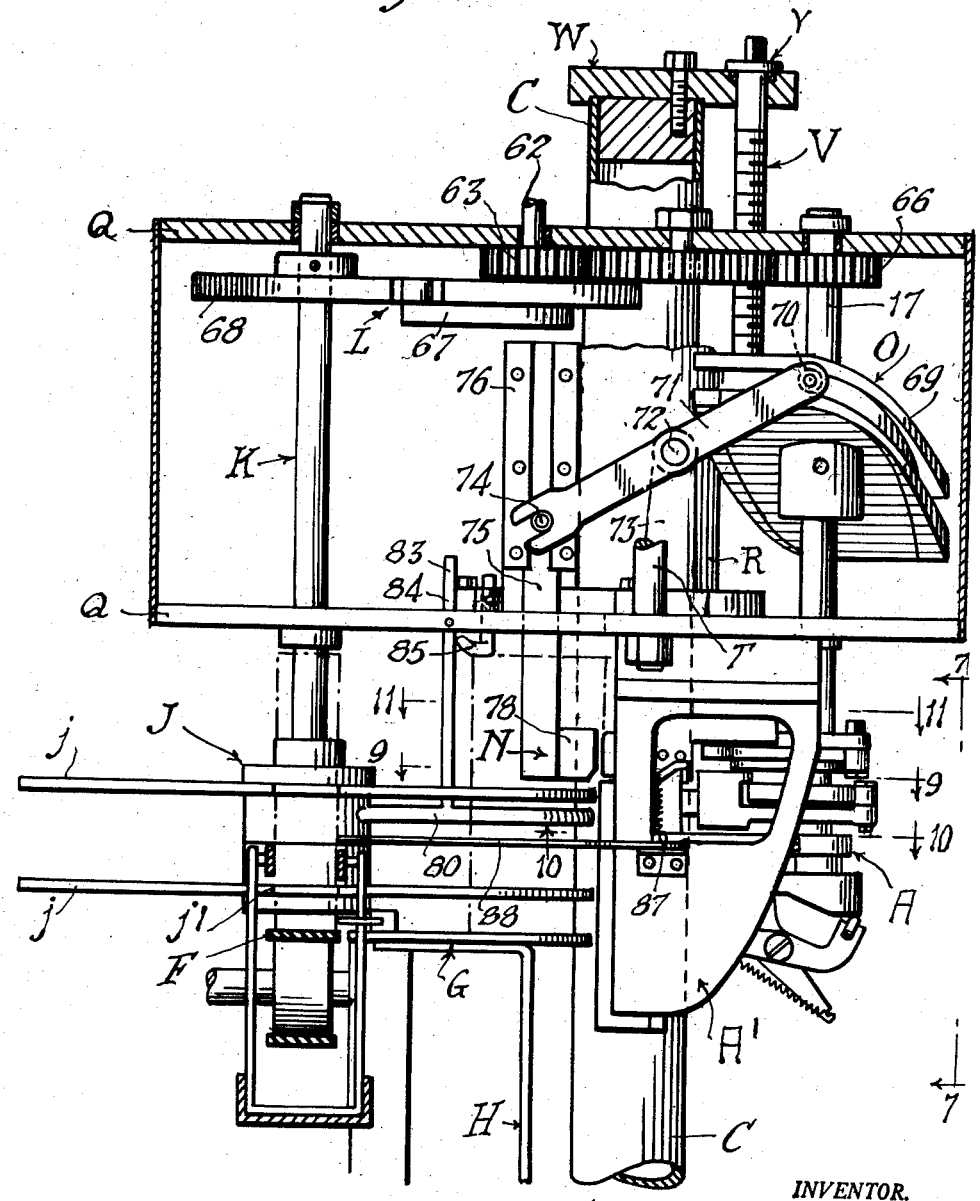

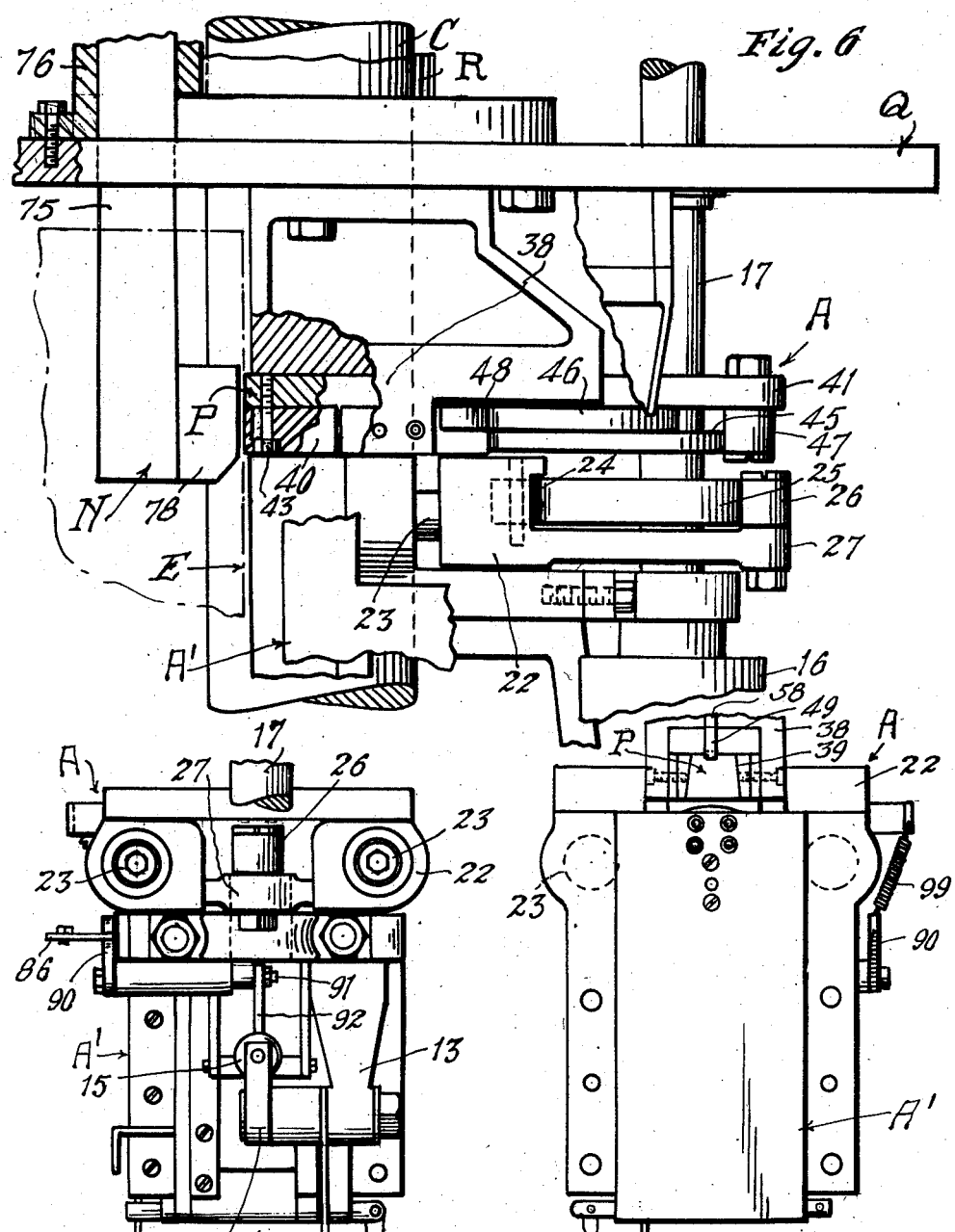

June 30, 1959 M. H. KLAUSMANN 2,892,430
MACHINE FOR INSERTING POURING SPOUTS INTO CONTAINERS
Filed Dec. 5, 1955 12 Sheets-Sheet 6
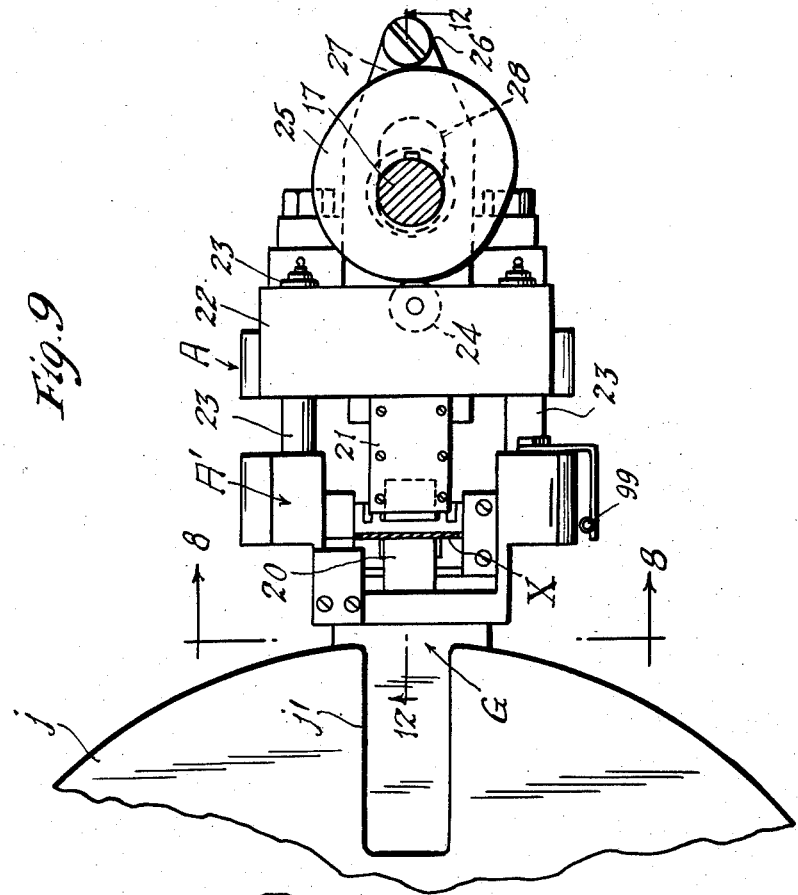
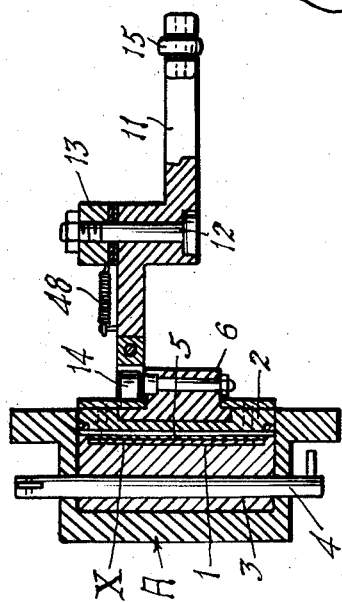
INVENTOR.
Milton H. Klausmann,
BY
Harry B. Cook,
ATTORNEY.

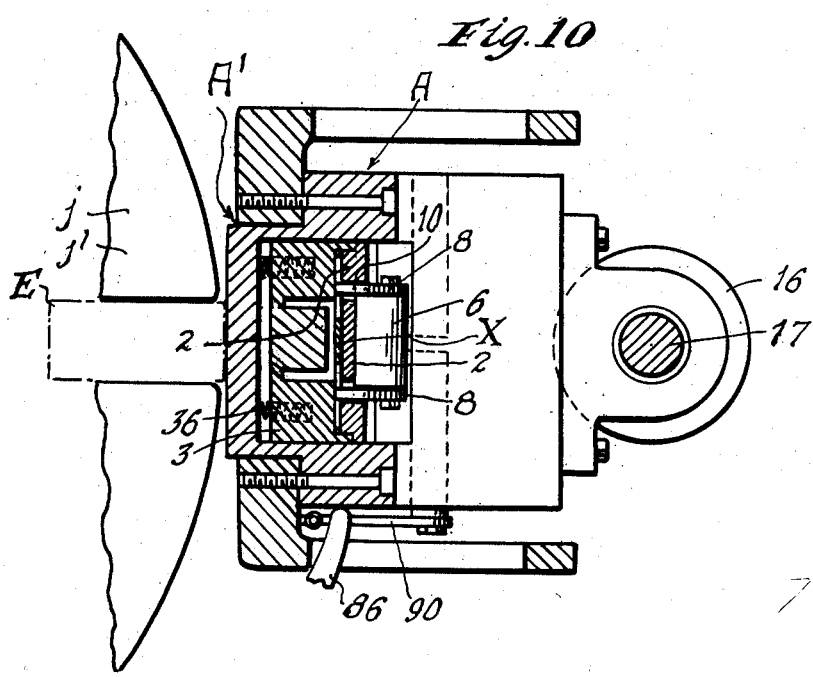
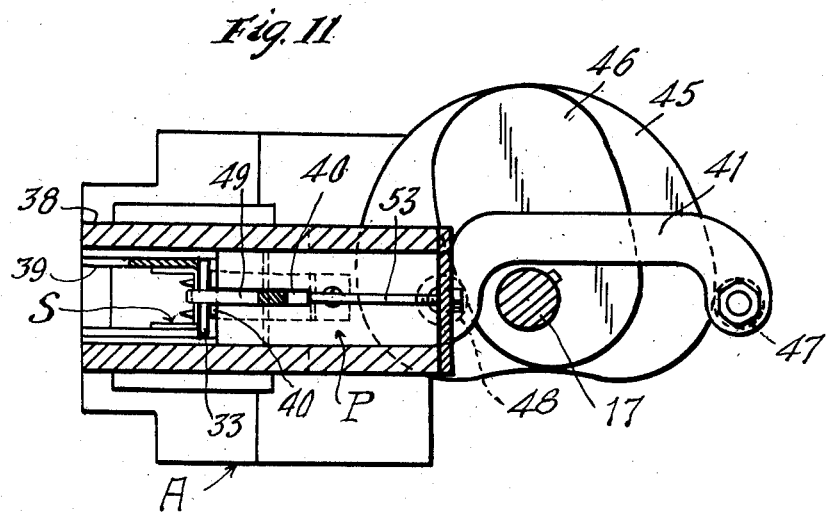

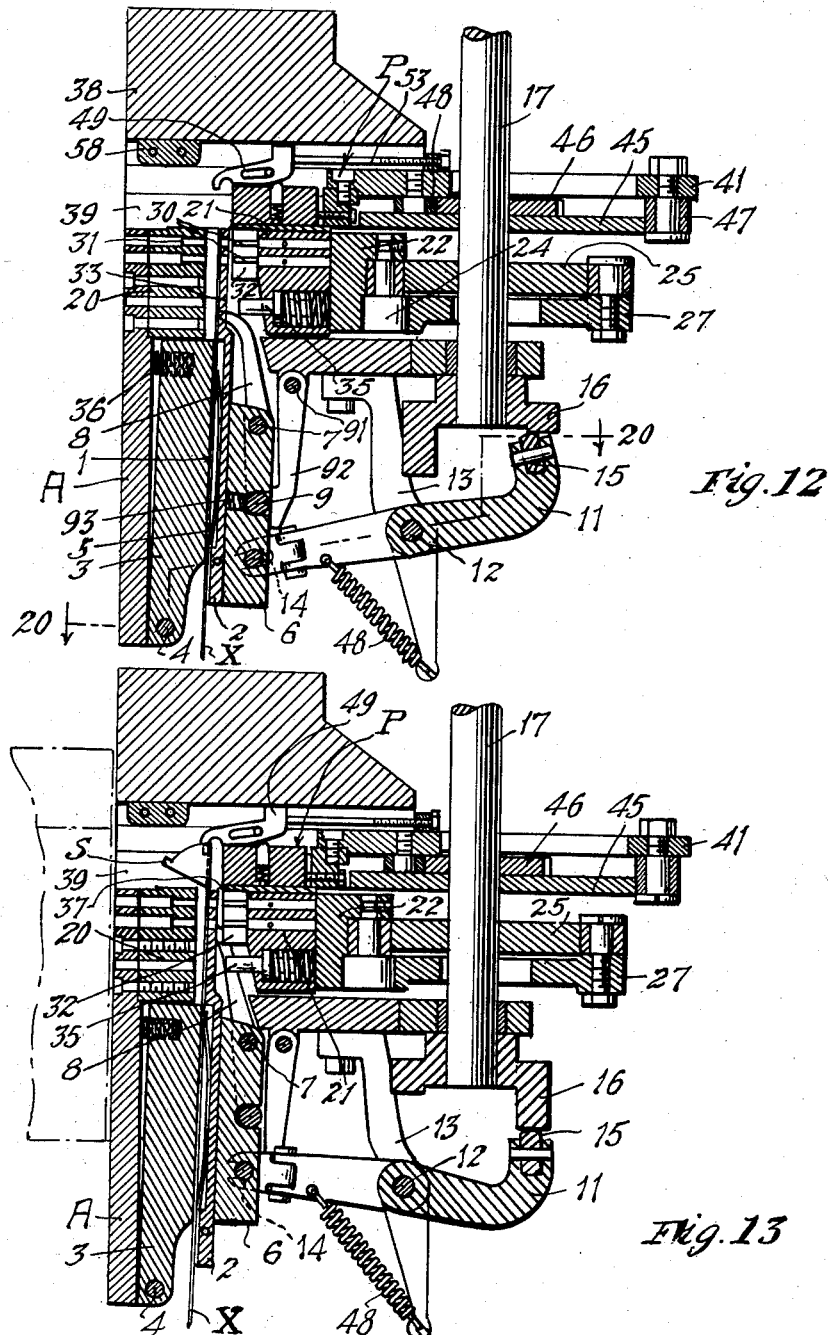

June 30, 1959  M. H. KLAUSMANN  2,892,430
MACHINE FOR INSERTING POURING SPOUTS INTO CONTAINERS
Filed Dec. 5, 1955  12 Sheets-Sheet 9

INVENTOR.
Milton H. Klausmann,
BY
Harry B. Cook,
ATTORNEY.

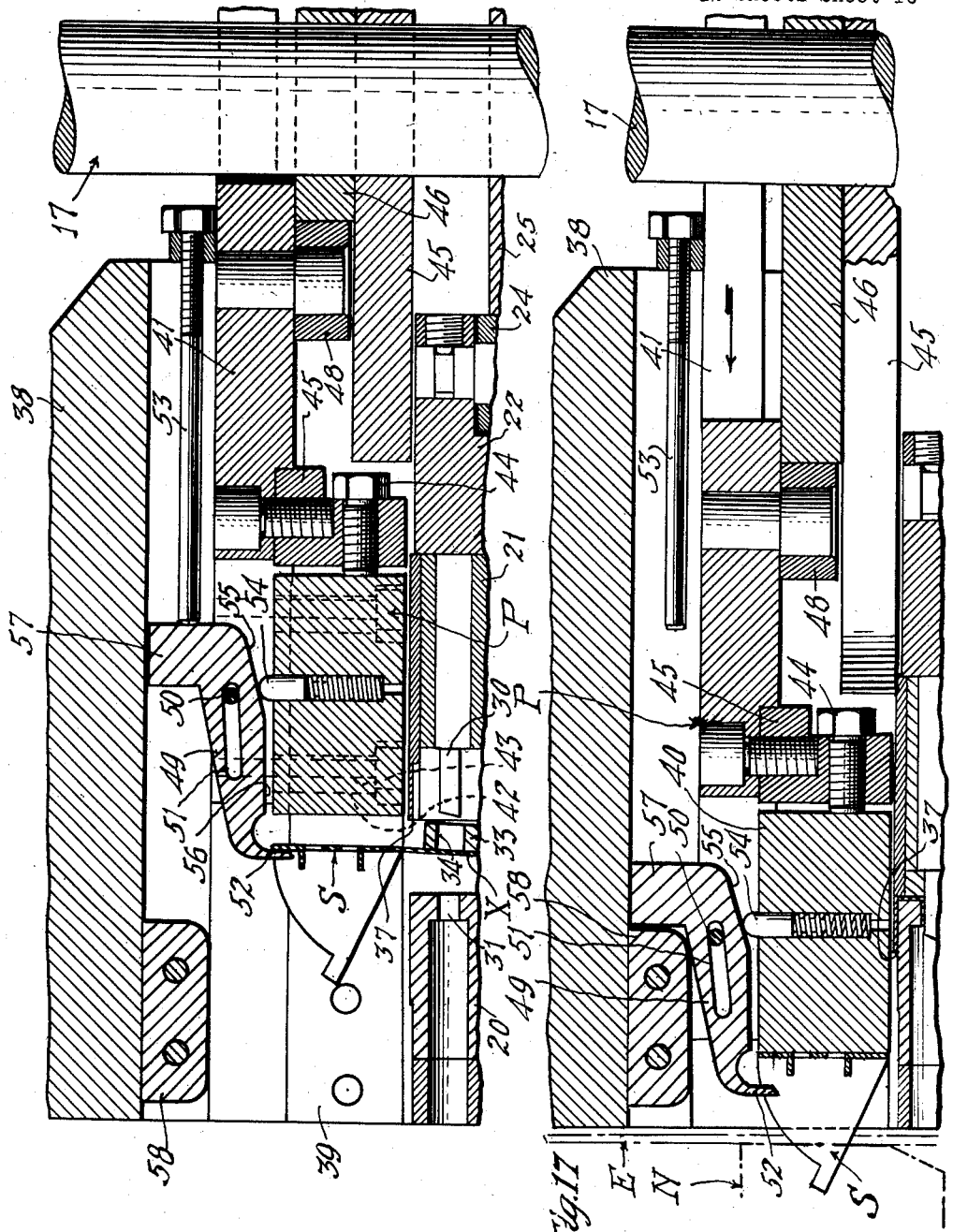

June 30, 1959 M. H. KLAUSMANN 2,892,430
MACHINE FOR INSERTING POURING SPOUTS INTO CONTAINERS
Filed Dec. 5, 1955 12 Sheets-Sheet 11
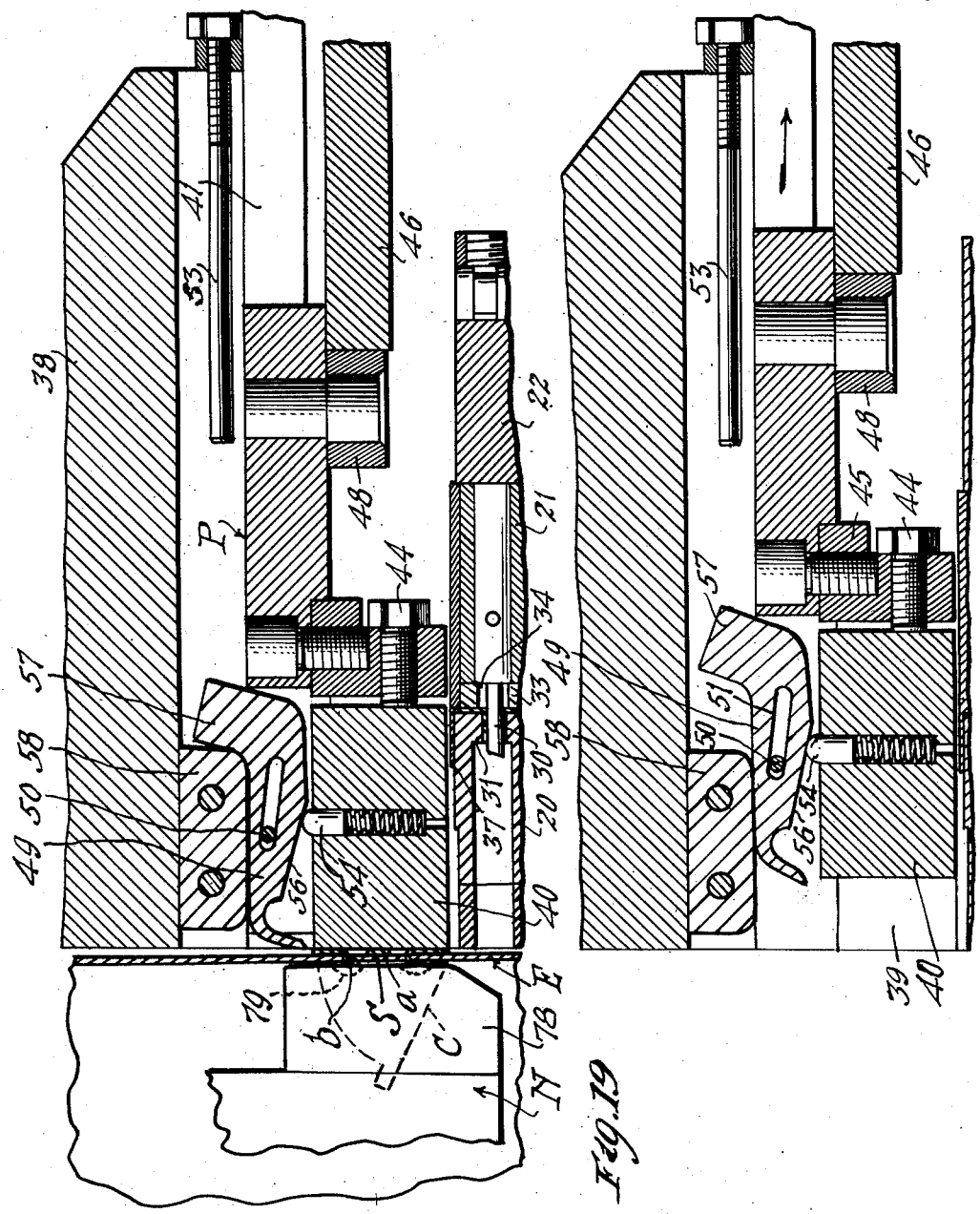
INVENTOR.
Milton H. Klausmann,
BY
Harry B. Rook,
ATTORNEY.

United States Patent Office 2,892,430
Patented June 30, 1959

2,892,430

MACHINE FOR INSERTING POURING SPOUTS INTO CONTAINERS

Milton H. Klausmann, Brielle, N.J., assignor to Seal-Spout Corporation, Newark, N.J., a corporation of New Jersey Application December 5, 1955, Serial No. 550,964

13 Claims. (Cl. 113—1)

This invention relates to machines of the general nature described in Patents Nos. 2,216,733 and 2,300,099, dated October 8, 1940, and October 27, 1942, respectively, for forming pouring spouts and inserting them into the walls of containers. The invention particularly relates to the handling of pouring spouts of the general type disclosed in Patents Nos. 1,966,284 and 2,011,434, dated July 10, 1934, and August 13, 1935, respectively, although the machine embodying the present invention may be utilized for inserting other types of pouring spouts into other containers.

In general, machines of this type include means whereby at one station the spouts in flat blank form are fed successively, the blanks are bent to form body portions and sector-shaped wings in angular relation thereto, prongs are stamped up from the body portions of the spouts, and the containers are fed past said station, the completed spouts being inserted into and secured to the walls of the containers as the containers move past said station.

In the machine described in Patent No. 2,216,733, mandrels mounted on a turret are inserted into open upper ends of the containers with a snug frictional fit and the containers are carried by the mandrels to the station at which the spouts are inserted by the mandrels during rotation of the turret, into the containers; and the mandrels also carry anvils that cooperate with a spout-pushing member or ram for clinching the prongs of the spouts on the walls of the containers.

One object of the present invention is to provide a simpler, less expensive and, for many purposes, more effective machine for presenting the containers to the spout-inserting mechanism and for mounting the spouts in the containers; and while any suitable type of spout-forming and inserting mechanism may be utilized, I have adopted and used substantially the same mechanism that is disclosed in Patent No. 2,300,099 with some modifications and additions thereto.

Another object is to provide in such a machine, means for moving one and the same anvil into and out of each of a plurality of containers in succession while the container is juxtaposed to the spout pusher or ram.

Another object of the present invention is to provide in a machine of this character a novel and improved construction and combination of a spout-forming and feeding mechanism, a conveyor, transfer mechanism for moving the containers from the conveyor into juxtaposition to the spout-inserting mechanism, and a combined anvil and container holder to cooperate with the spout-inserting mechanism for inserting the spout into the container, said transfer mechanism serving also to move the container with the spout inserted therein from the spout-inserting position onto the same or another conveyor for conveyance of the container to any suitable point such as a filling machine.

Another object of the invention is to provide novel and improved means for actuating the anvil and container holder into and out of the containers in timed relation to the movement of the containers to the spout-inserting station and the movement of the spout-inserting mechanism.

A further object is to provide in such a machine novel and improved mechanism for diverting or transferring the containers from their path of movement from the source of supply into and away from the spout-inserting station so that the containers can be presented to and moved away from said station in rapid succession and can be held momentarily stationary at said station during the spout-inserting mechanism.

Still another object is to provide such a machine wherein the spout-forming and inserting mechanism, the container-transfer mechanism and the actuating means for said mechanisms shall be mounted on a support for unitary movement relatively to the conveyor to provide for the insertion of pouring spouts into containers of different heights and also to provide for adjustment of the spout-inserting mechanism relative to the walls of containers of a given height.

Other objects are to provide a novel and improved construction for the spout-forming and inserting mechanism which shall be simple, easy to assemble and disassemble, and reliable and durable in operation; to provide novel and improved means in the spout-inserting mechanism for holding the formed spouts in proper position for insertion into the containers after severance of the spouts from the spout blank strip; and to obtain other advantages and results that will be brought out by the following description in conjunction with the accompanying drawings in which Figure 1 is a front elevation of the machine showing a portion of the container conveyor belt and containers being fed to and from the spout-inserting station, with portions omitted for clearness in illustration;

Figure 2 is an enlarged side elevational view of the machine embodying the invention with the container conveyor shown in transverse section and with a container illustrated in dot and dash lines at the spout-inserting station;

Figure 3 is a fragmentary elevational view of a portion of the frame of the spout-forming and inserting mechanism, illustrating the means for adjusting said mechanism relative to the conveyor, with portions broken away and shown in section for clearness in illustration;

Figure 5 is an enlarged fragmentary side elevational view of the spout-forming and inserting mechanism, the anvil and the operating mechanism therefor, and the container transfer mechanism, the casing for said mechanism illustrated in Figures 1 and 2 having been removed and the conveyor being shown in transverse section;

Figure 6 is a further enlarged and fragmentary side elevational view of the spout-forming and inserting mechanism and the anvil with portions broken away and other portions shown in section;

Figure 7 is a rear elevational view of the spout-forming and inserting mechanism from approximately the plane of the line 7—7 of Figure 5 with parts omitted;

Figure 8 is a front elevational view of the spout-forming and inserting mechanism from approximately the plane of the line 8—8 of Figure 9;

Figure 9 is a horizontal sectional view approximately on the plane of the line 9—9 of Figure 5;

Figure 10 is a horizontal sectional view approximately on the plane of the line 10—10 of Figure 5;

Figure 11 is a fragmentary horizontal sectional view approximately on the plane of the line 11—11 of Figure 5;

Figure 12 is a vertical longitudinal sectional view approximately on the plane of the line 12—12 of Figure 9 showing the spout-forming and inserting mechanism prior to the formation of a spout;

Figure 13 is a similar view showing a formed spout in position to be severed from the blank strip and pushed into the wall of a container;

Figure 16 is a greatly enlarged vertical sectional view through the spout-inserting mechanism showing the ram in its initial or withdrawn position and a completed spout in the position shown in Figure 13 and engaged by the spout supporting finger;

Figure 17 is a similar view showing the spout being inserted into the wall of a container;

Figure 18 is a view similar to Figure 17 showing the spout completely inserted into the container and clinched on the container wall;

Figure 19 is a similar view showing the ram during its return movement to its initial position;

Figure 20 is a horizontal sectional view approximately on the plane of the line 20—20 of Figure 12;

Generally describing the invention, a strip of spout blanks comprising flat spout blanks connected in end-to-end relation is fed step by step to successively locate the blanks in proper relation to dies which bend the sector-shaped wings of each spout relatively to the body portion of the spout and to form the prongs in the body portion of the spout, after which the completed spout at the leading end of the blank strip is projected into the spout-inserting mechanism, severed from the strip and pushed through and clinched on the wall of a container, there being one spout blank bent and punched simultaneously with the shearing and conveying of the next preceding spout. The containers are moved one after another by the conveyor to the transfer mechanism which moves the containers in succession from the conveyor to a station into juxtaposition to the spout-inserting mechanism just prior to the shearing of the spout from the blank strip and holds the container stationary, whereupon the anvil is inserted into said container at the side of the container wall opposite the spout-inserting mechanism to cooperate with the ram of said mechanism for pushing the spout through the container wall and clinching the prongs on said wall; then during the formation of the next succeeding spout and before movement of the container away from said station, the anvil is withdrawn from the container, then the container is moved by the transfer mechanism to a desired point, for example, on to a conveyor, and simultaneously another container is moved to the spout-inserting station.

For the purposes of illustrating the principles of the invention, the spout herein contemplated comprises a body portion a, prongs b on the body portion to penetrate and be clinched upon a container wall for securing the spout therein, and wings or flanges c to move in the pouring opening of the container as the spout is moved from closed to open position.

While other spout-forming and feeding mechanisms may be utilized, for the purpose of illustration, I have shown mechanism A like that disclosed in Patent No. 2,300,099 which includes a main support or bracket A' that is secured to and suspended from a main frame B which is in turn mounted and vertically adjustable on a pedestal C whose base D supports the machine on any suitable surface such as a building floor.

Figure 4:
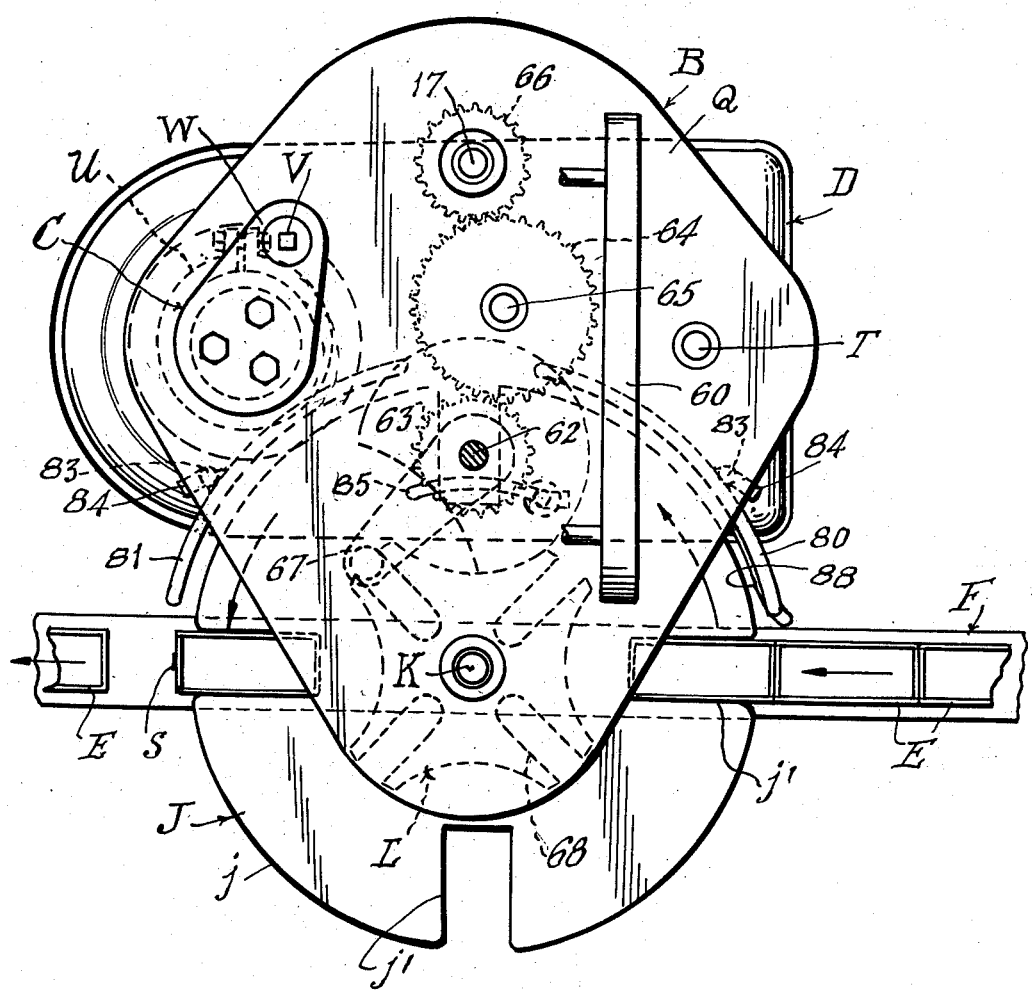
Figure 4 is an enlarged top plan of the machine approximately on the plane of the line 4—4 of Figure 1.

The containers E are shown as moved from a suitable source of supply on the upper reach of an endless conveyor belt F which is juxtaposed to a container-supporting table G that is mounted at one side of said reach of the belt beneath the spout-inserting mechanism by suitable means such as bracket H which is adjustably mounted on the pedestal C by a known type of split ring clamp I. The top of the table G is approximately in the same plane as the top surface of said belt reach and beneath the spout-inserting mechanism. Above said reach of the conveyor and the table is a container transfer mechanism J which is shown as having two coaxial horizontal vertically spaced disks j rotatable about a vertical axis, each of which has four equidistantly spaced notches j' in register with the corresponding notches of the other disk and the leading container on the conveyor is moved by the conveyor into the notches that are aligned with conveyor as best shown in Figures 1 and 4. The disks j are mounted on a shaft K that is journaled in the frame B and is rotated intermittently or step-by-step by a known type of Geneva gear L which is in turn driven from an electric motor M through suitable gearing to be later described.

In operation of the machine, the transfer disks j are rotated intermittently in steps of 90° and the conveyor F continuously moves the containers so as to locate one container in one of the notches j', the conveyor belt slipping beneath the containers while movement of the containers is interrupted by the disks. Upon each step of movement of the disks, one container is swung from the conveyor onto the table G in juxtaposition to the spout-forming and inserting mechanism A, thereupon an anvil N is moved by a driving mechanism O into said container through the open end thereof, close to the wall of the container at the side thereof opposite the spout-inserting mechanism to support said wall and receive the thrust of the spout-inserting ram P (Figures 6, 13 and 18) during the insertion of the spout and clinching of the prongs thereof in the container wall. Thereupon the anvil is withdrawn by the drive mechanism O and on the next step of movement of the transfer disks j, the container is swung from the table G back onto the conveyor F at the side of the transfer mechanism opposite that at which the container approached the transfer mechanism. Then the container is moved by the conveyor to a desired point, for example, to a filling machine.

The frame B is shown as comprising two horizontal frame plates Q that are connected by a sleeve R which is slidable on the pedestal C, suitable tie bolts T also connecting the plates for rigidity of the structure. The frame is normally supported in the desired elevation on the pedestal by a split spring ring clamp U (Figures 1 and 3) on which the lower frame plate rests, and the frame is further supported and adjustable by a screw V that has a screw-threaded connection with the upper frame plate Q and is rotatably mounted in a head plate W, rigidly secured to the top of the pedestal C, the screw having a head v abutting the top of said head plate. Obviously by loosening the clamp U and rotating the screw V, the frame, including the spout-forming and inserting mechanism A mounted thereon, may be adjusted vertically relatively to the conveyor belt F to accommodate containers of different heights and to locate any given size of container in the desired relation to the spout-inserting mechanism.

While the spout-forming and inserting mechanism is in large part described in Patent No. 2,300,099, for convenience in understanding the machine of this application, the mechanism will now be described.

On the bracket A' is mounted a guide for a continuous strip X of spout blanks (Figures 2 and 20). While the machine of the present invention may be utilized for forming and conveying different types of spouts, for the purpose of illustrating the principles of the invention, the spout S herein contemplated is the same as that shown in said Patent No. 2,300,099 and described in column 3 hereof.

The machine of the present invention includes a main support or bracket A' that may be mounted in a suitable manner and which in the machine of the above-mentioned Patents Nos. 2,216,733 and 2,300,099 is supported on the main frame of the machine at one side of the carriage which supports and moves the containers past the spout-forming and inserting mechanism. On the bracket is mounted a guide for a continuous strip X of spout blanks. As shown, this strip of spout blanks includes a plurality of flat blanks connected in end-to-end relation, each blank being shaped to provide the body portion and side wings of a finished spout (see Figures 16 and 11). The guide has a guideway 1 which is shown as formed between two plates 2 and 3, the latter of which is hingedly connected at 4 on a horizontal axis on the bracket A'. Preferably a flat spring 5 is provided in a recess between the plates 2 and 3 for yieldingly frictionally holding the blank strip against movement.

The feeding mechanism for the blank strip includes a block 6 slidably mounted in the outer plate 2 and having pivotally connected thereto at 7 a pair of feed dogs 8 which are connected to move together by a cross-rod 9 at their lower ends. The upper ends of the dogs have inturned fingers 10 to engage behind the edges of the respective blanks of the blank strip X as shown in Figures 3 and 6, the feed dogs being normally influenced into feeding relation to the blank strip by a spring-pressed plunger 93. The block 6 and dogs 8 are reciprocated with a step-by-step movement to feed the blank strip one blank at a time, by a lever 11 which is journaled intermediate its ends at 12 on an arm 13 projecting from the bracket A and has a pin and slot connection 14 at one end with the block 6 and its other end provided with a follower roller 15 that engages a horizontal cam 16 carried by a vertical drive shaft 17 journaled in suitable bearings including a bearing 18 on the bracket A. The drive shaft 17 may be connected to any suitable source of power in any suitable manner known to those skilled in the art, but is here driven by motor M.

Preferably a tension spring is provided for actuating the feed block 6 in the direction opposite to that in which it is moved by the cam 16, said spring also holding the roller 15 in contact with said cam.

Juxtaposed to the guideway 1 adjacent the upper end thereof is a spout forming mechanism. This mechanism includes a die 20 juxtaposed to the guideway 1 at one side thereof, and a complemental movable die 21 at the opposite side of the guideway. The movable die 21 is carried by a block 22 which is slidably mounted on guide rods 23 projecting horizontally from the main support or bracket A' (Figures 6, 7 and 9), and the block 22 carries the roller 24 that follows a cam 25 keyed on the shaft 17 and followed by another roller 26 that is journaled on an extension 27 of the block 22, the two rollers 24 and 26 engaging the cam 25 at diametrically opposite points and the extension 27 having a slot 28 for clearance around the shaft 17.

Figure 21:
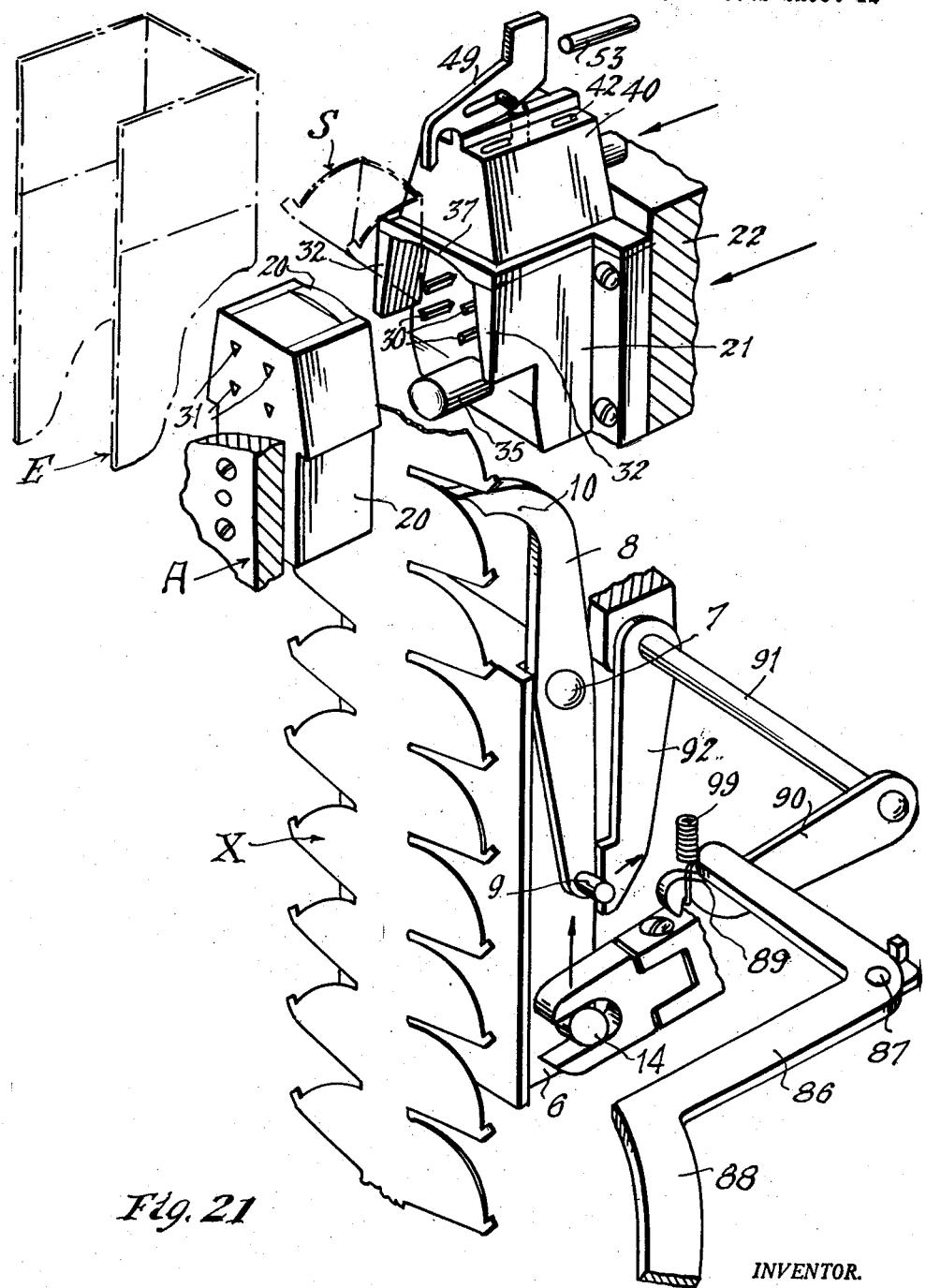
Figure 21 is a schematic exploded perspective view of some of the parts of the mechanism some of which are displaced from their positions shown in the other figures, to more clearly show the cooperative relation of the parts, and some parts being omitted.

The die block 21 carries several punches to cooperate with openings 31 in the die block 20 for forming the prongs b on the spouts, and at opposite sides of the punches the die block carries bending arms or wings 32 to embrace and cooperate with a portion of the die block 20 for forming the flanges c of the spout as shown in Figures 12 and 21.

The plate 2 of the guide has an extension 33 interposed between the spout blank strip B and the die blocks 21 to clear the wings 32, said extension being formed with openings 32 through which the punches 30 may freely pass; and the die block 21 has mounted therein a spring plunger 35 to engage said extension 33 to swing the guide about the pivot 4 and force the extension into tight contact with the spout blank strip B as the movable die block 21 moves toward the die block 20. Springs 36 are provided between the plate 3 of the spout guide and the bracket A for normally swinging the guide in the opposite direction.

Figure 14:
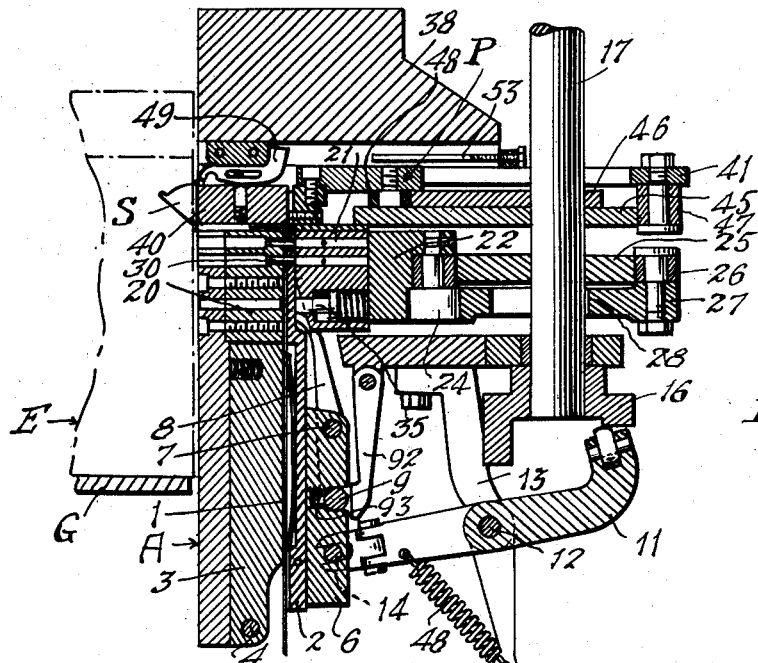
Figure 14 is a similar view showing the combination of the spout-inserting operation and the simultaneous formation of the next succeeding spout.
Figure 15:
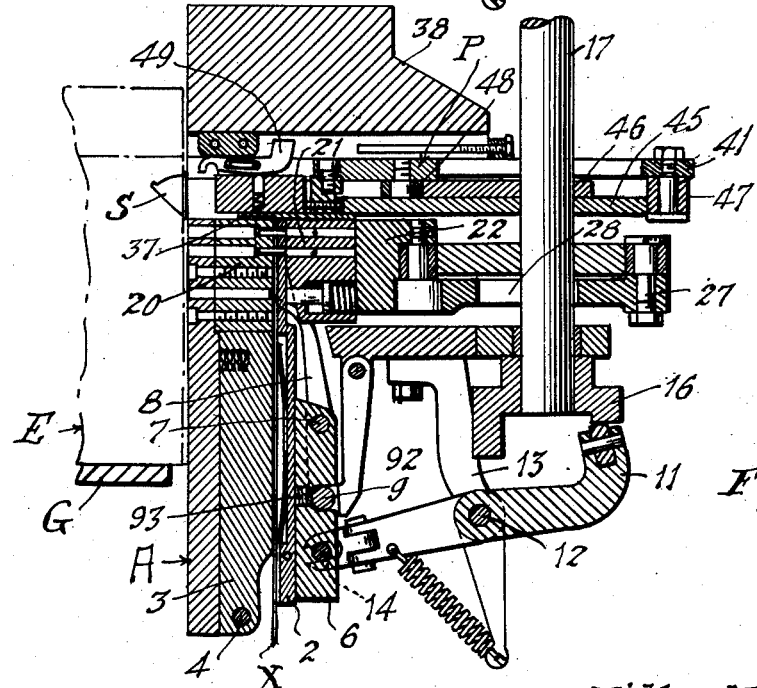
Figure 15 is a similar view showing the withdrawal or return of the spout-inserting mechanism toward its normal or initial position and before feeding of the next succeeding spout to the spout-inserting mechanism.

In operation, the spout blank strip B is fed into the guideway 1 by hand until the endmost spout blank is disposed in proper relation to the die block 20, as shown in Figure 12, with the fingers 10 of the feed dogs 8 underlying the edges of the blank as shown in Figures 12 and 21 and with said fingers at the end of the strip feeding movement as shown in Figure 13. Thereupon, the machine is started in operation to rotate the shaft 17 so that the die block 21 is actuated toward the die block 20 to cause the punches 30 to penetrate the body portion of the spout blank and form the prongs b. Simultaneously the wings 32 of the die block 20 bend the spout blank to form the flanges c all as shown in Figure 14. During this operation, the plunger 35 and extension 33 of the plate 2 firmly hold the blank strip against movement. During continued operation, the die block 21 is withdrawn from the die block 20, the extension 33 being held tightly against the blank strip by the plunger 35 until the punches have been completely withdrawn from the openings in the spout blank and the wings 32 have cleared the flanges c, the extension 33 thus serving as a stripper. As the die block 21 reaches the end of its withdrawing movement, the plunger 35 releases the extension 33 so that said extension and the spout guide are swung by the spring 36 away from the die block 20 to withdraw the prongs from the openings 31 and permit the next step of feeding of the spout blank strip. In the meantime, the feed dogs 8 will have been lowered for the next step of feeding. The end of this operation is shown in Figure 12. Thereafter, the feed block 6 is actuated upwardly to feed the blank strip one step, thereby moving the completed spout upwardly and locating the next succeeding spout blank in proper relation to the dies 20 and 21 as shown in Figure 13, for the formation of the next spout as above described.

The next step is the severing of the completed spout from the spout blank strip and this is accomplished simultaneously with formation of the next succeeding spout. For this purpose, the die block 21 has a shearing blade 37 that cooperates with the upper edge of the die block 20 to shear the spout blank strip as shown in Figures 13, 14, 16 and 17.

The severed completed spout is then pushed through the wall of the container E that is juxtaposed to the spout-forming and inserting mechanism. The spout-inserting mechanism is shown as comprising a spout holder 38 that has a spout-receiving channel 39 (Figures 8 and 12) of a cross-sectional shape corresponding to the shape of the body of the spout and disposed above and extending transversely of the guideway 1 to receive the completed spout as the latter is ejected from the guideway during the step of feeding of the strip X. The pusher or ram P is slidable in the channel 39 to push the severed and completed spout through the channel from the guideway 1 to and through the wall of the container (Figures 13, 16, 17 and 18). The pusher may be of any suitable construction and actuated by any suitable means but preferably as shown, comprises a head block 40 (Figures 11, 12 and 16) of a cross section approximately corresponding to the shape of the channel 39 and adjustably connected to a guide and actuating bar 41. As shown, the head block has elongate slots 42 through which pass cap screws 43 that are screw-threaded into the bar 41 so that by loosening the screws 43 the block may be slid longitudinally of the bar 41 to adjust the length of the ram and insure proper cooperation of the ram with the anvil. For easily and accurately adjusting the block, an adjusting screw 44 is threaded in a laterally projecting arm 45 on the bar 41 to abut the outer end of the block. A pair of cams 45 and 46 are keyed on the shaft 17, one cam being engaged by a follower roller 47 mounted on the bar 41 to move the ram in one direction, namely, to withdraw the ram to its normal position, and the other cam being followed by a roller 48 on the bar 41 to move the ram in the opposite direction to insert the spout. Preferably the cams are so relatively contoured that the cam 46 will be accelerated the movement of the ram just before and during penetration of the container wall by the spout to facilitate the insertion of the spout.

Where the straight edges of the flanges of the spouts are disposed at an angle of less than 90° to the plane of the body portion of the spout, it is desirable to have means for holding the spout in proper vertical position for insertion into the container wall. Such means is shown as comprising a dog 49 mounted on the bar 41 by a pin 50 that passes through a longitudinal slot 51 in the dog. One end of the dog 49 has a depending finger 52 extending beyond and in spaced relation to the leading end of the head block 40 of the ram, the dog normally being tilted to bring the finger into juxtaposition with the end of the head block 40 by engagement of the dog with an adjustable screw 53 mounted in the spout holder, when the ram is in its normal retracted position, as best shown in Figure 16. A spring actuated detent 54 cooperates with beveled surfaces 55 and 56 on the dog to hold the dog respectively in the position as described and shown in Figure 16 and in the normal or retracted position as shown in Figure 18. The dog is moved into the retracted position of Figure 18 by engagement of a tail portion 57 with a fixed block 58 in the spout holder.

In operation when the ram is withdrawn to its normal position ready to push a completed spout into a container wall, the completed spout at the leading end of the blank strip is pushed upwardly between the head block 40 and the finger 52 of the dog as shown in Figure 16, so that when the spout is severed from the blank strip, it will be prevented by the finger 52 from falling forwardly as shown in Figure 17. However, when the ram approaches the end of its spout-inserting movement, the dog is tilted into its retracted position out of the way of the spout as shown in Figure 18. This insures proper positioning and insertion of the spout in the container wall.

It will be understood that the various cams 16, 45 and 46 will be so shaped and related to each other as to operate the feed block 6, the movable die block 21, and the ram P in properly timed relation to each other, and to the container transfer mechanism J and the anvil N.

Any suitable drive mechanism may be utilized but as shown, the electric motor M is mounted on the top of the frame B and connected by belt and pulley mechanism 60 to the input shaft of any suitable gear box 61 whose output shaft 62 is journaled in the top plate Q of the frame B and has connected thereto a pinion 63 that meshes with an idler gear 64 journaled on a stud 65 on the underside of said frame plate and meshing with a pinion 66 rigidly connected to the shaft 17 (Figures 2, 4 and 5). The driver 67 of the Geneva gear is connected to the shaft 62 while the driven element or star wheel 68 of the Geneva gear is connected to the shaft K on which the disks j of the transfer mechanism J are mounted.

The drive for the anvil N is shown as comprising a cam 69 mounted on the shaft 17 and in whose groove rides a follower roller 70 on one end of a lever 71 that is pivoted at 72 on a bracket 73 that is mounted on the bottom frame plate Q (Figure 5). The other end of the lever 71 has a pin and slot connection 74 and an anvil bar 75 that is slidably mounted in a guide 76 supported on the lower frame plate. The anvil bar 75 projects downwardly through an opening in the frame plate and has an anvil block 78 secured to the lower end thereof. The face of the anvil block corresponds in shape and size to the body portion of the spout and preferably has depressions 79 therein to deflect the prongs of the spout and facilitate clinching thereof as the spout flanges are pushed through the container wall (Figure 18).

It is desirable to provide curved guides 80 and 81 (Figures 1, 4 and 5) between the disks of the transfer mechanism j to prevent the containers from flying out of the notches in said disks during transfer of the container from the conveyor to the spout-inserting mechanism and from the spout-inserting mechanism back to the conveyor. As shown, these guides are curved bars that are secured to the lower frame plate Q by rods 83 extending through the frame plate and adjustably fastened thereto by set screws 84. Another guide 85 is similarly adjustably mounted in said frame plate and has a portion to closely overlie the upper edges of the container when the latter is juxtaposed to the spout-inserting mechanism, to press and hold the container against the table G and thereby insure proper positioning of the container relative to the spout-inserting mechanism.

Means is also provided for preventing feeding and insertion of a spout in the absence of a container on the conveyor so as to avoid the possibility of jamming the machine or injury of parts thereof by a surplus spout. For this purpose a bell crank lever 86 is pivotally mounted at 87 on the bracket A' (Figures 2 and 21) with one arm 88 extending into the path of movement of the containers from the conveyor to the spout-inserting station. The other arm of the bell crank slidably engages a cam surface 89 on an arm 90 that is rigidly connected to a shaft 91 that carries an arm 92 to engage the cross rod 9 which connects the feed dogs 8. The said dogs are normally influenced by a spring 93 (Figure 12) into feeding relation to the blank strip, but the dogs are normally held out of feeding relation to the blank strip by the lever 87, arm 90 and the arm 92 which is normally pressed against the cross rod 9 to swing the fingers 10 of the feed dogs away from the blank strip. A spring 94 normally urges the arm 90 upwardly and through the cam surface 89 urges the arm 88 into the path of the containers. Should no container be present on the conveyor approaching the transfer mechanism, the arm 92 will remain in its normal position so as to hold the feed dogs against feeding, but when a container is present the lever 86 is actuated so as to move the arm 92 away from the cross rod 9 and permit the dogs to engage the blank strip to move the latter for feeding one spout blank.

It will be understood that other transfer means could be utilized for moving the containers from a predetermined path of movement into and out of juxtaposition to the spout-inserting mechanism.

While I have described and shown the invention as embodying certain structural details, it will be understood that this is primarily for illustrating the now preferred form of the invention and that many modifications and changes can be made in the construction of the machine within the spirit and scope of the invention.

What I claim is:

1. A machine for mounting a pouring spout in a wall of a container having an open end, comprising a frame providing a spout-inserting station, means for moving separately and in succession to and from said station a plurality of containers each having a predetermined zone through which a portion of a spout is to be inserted, said means including a horizontal conveyor continuously movable in a straight path past and alongside said station for moving said containers in a predetermined path in file formation to a point at one side of said station, apparatus between said conveyor and said station successively to divert each container from said conveyor, hold the container momentarily at said station for insertion of the spout and then move the container away from said station and onto said conveyor at the opposite side of said station, mechanism at said station for mounting a spout in said predetermined zone of the container while the container is stationary, including a ram at the outer side of said wall for pushing a spout to insert said portion of the spout through said zone of said wall, an anvil, and means operative while each container is stationary at said station for moving said anvil into said container and momentarily holding it in juxtaposition to the inner side of said zone of said wall to support said zone under the thrust of said ram and for retracting said anvil from said container to permit said apparatus to move the container carrying said spout from said station onto said conveyor.

2. A machine as defined in claim 1 with the addition of means mounting said spout-inserting mechanism and said apparatus on said frame for unitary vertical movement relatively to said conveyor for adjustment of said ram relatively to said containers to provide for the insertion of spouts into containers of different heights and for insertion of spouts at different positions in the walls of containers of a given height.

3. A machine as defined in claim 1 wherein said conveyor is movable from a point at one side of said station, past the station and to a point at the other side of the station, and said apparatus is constructed to divert the containers in succession from the conveyor at the first-mentioned side of said station and to return said containers in succession to said conveyor at the second-mentioned side of the station, said apparatus comprising a transfer device intermittently rotatable above said conveyor and formed to engage said containers singly and to move them from said conveyor to said station, momentarily hold them at said station and move them from said station onto said conveyor.

4. A machine as defined in claim 1 wherein said conveyor is movable from a point at one side of said station, past the station and to a point at the other side of the station, and said apparatus is constructed to divert the containers in succession from the conveyor at the first-mentioned side of said station and to return said containers in succession to said conveyor at the second-mentioned side of the station, said apparatus comprising a transfer device intermittently rotatable above said conveyor and formed to engage said containers singly and to move them from said conveyor to said station and from said station onto said conveyor with the addition of a table at said station below said ram and wherein said containers are gravitationally frictionally supported on the conveyor and said transfer device has circumferentially spaced notches into each of which a container may slide when the notch is alined with the conveyor, and said transfer device upon rotation thereof slides said containers in succession from the conveyor onto said table and from said table onto said conveyor.

5. A machine as defined in claim 1 wherein said conveyor is movable from a point at one side of said station, past the station and to a point at the other side of the station, and said apparatus is constructed to divert the containers in succession from the conveyor at the first-mentioned side of said station and to return said containers in succession to said conveyor at the second-mentioned side of the station, said apparatus comprising a transfer device intermittently rotatable above said conveyor and formed to engage said containers singly and to move them from said conveyor to said station and from said station onto said conveyor with the addition of a table at said station below said ram and wherein said containers are gravitationally frictionally supported on the conveyor and said transfer device has circumferentially spaced notches into each of which a container may slide when the notch is alined with the conveyor, and said transfer device upon rotation thereof slides said containers in succession from the conveyor onto said table and from said table onto said conveyor, and means mounting said spout-inserting mechanism and said transfer device on said frame for unitary vertical movement relatively to said conveyor and to said table to provide for adjustment of said ram relatively to said container.

6. A machine as defined in claim 1 wherein said mechanism also includes a support bracket mounted on said frame adjacent said station, means on said bracket for feeding longitudinally step-by-step a strip of integrally connected flat blanks for spouts including a guideway for said strip, a die-section juxtaposed to said guideway at one side of said strip, said bracket having a pair of parallel guide rods projecting therefrom beyond the other side of said strip and perpendicularly to said guideway, a reciprocable die-section slidably mounted on said rods and complemental to the other die-section, said die sections being cooperatively formed to shape a blank into a complete spout at the leading end of said strip of blanks, a completed spout being projected into the path of said ram upon each step of feeding movement of said strip of blanks and with the addition of means reciprocating said ram, means for reciprocating said reciprocable die, and means for severing each complete spout from said blank strip, all in synchronism.

7. A machine as defined in claim 1 wherein the conveyor is a linearly movable belt, and with the addition of a table at said station below said ram and wherein said containers are gravitationally frictionally supported on the conveyor and said apparatus slides said containers in succession from the conveyor onto said table and from said table onto said conveyor, a support, and means mounting said spout-inserting mechanism and said apparatus on said support for unitary movement relatively to said conveyor and to said table to provide for adjustment of said container relatively to said container.

8. A machine as defined in claim 1 wherein the conveyor is a linearly movable belt, and with the addition of a table at said station below said ram and wherein said containers are gravitationally frictionally supported on the conveyor and said apparatus slides said containers in succession from the conveyor onto said table and from said table onto said conveyor, a support, and means mounting said spout-inserting mechanism and said apparatus on said support for unitary movement relatively to said conveyor and to said table to provide for adjustment of said ram relatively to said container, said frame comprising a vertical pedestal having a base to hold the pedestal upright on a floor or the like, and said spout-inserting mechanism and transfer device including a common frame mounted to slide up and down on said pedestal, and means for positively holding said frame in adjusted positions on said frame.

9. A machine as defined in claim 1 wherein the conveyor is a linearly movable belt, and with the addition of a table at said station below said ram and wherein said containers are gravitationally frictionally supported on the conveyor and said apparatus slides said containers in succession from the conveyor onto said table and from said table onto said conveyor, a support, and means mounting said spout-inserting mechanism and said apparatus on said support for unitary movement relatively to said conveyor and to said table to provide for adjustment of said ram relatively to said ram, said frame comprising a vertical pedestal having a base to hold the pedestal upright on a floor or the like, and said spout-inserting mechanism and transfer device including a common frame mounted to slide up and down on said pedestal, a screw swivel connected to one of said pedestal and said frame and having a screw threaded connection with the other, and releasable means for positively holding said frame against descent on said pedestal.

10. In a spout-forming and handling machine, means including a guide-way for feeding longitudinally step-by-step a strip of integrally connected flat blanks for spouts, means juxtaposed to said guide for bending a blank to form a complete spout having a body portion and side flanges, a guide channel extending transversely of the outlet end of said guideway to receive the complete spout at the leading end of said strip upon each step of movement with the body portion of the spout extending transversely of the channel, means for severing said complete spout from said strip after said spout has been located in said channel, and means for conveying the severed spouts in succession through the channel to a predetermined point, the last-named means including a dog having a finger to hook over the upper end of said body portion when the spout enters said channel to hold the spouts against tilting forwardly.

11. In a spout forming and handling machine, means including a guide-way for feeding longitudinally step-by-step a strip of integrally connected flat blanks for spouts, means juxtaposed to said guide for bending a blank to form a complete spout having a body portion and side flanges, a guide channel extending transversely of the outlet and of said guideway to receive the complete spout at the leading end of said strip upon each step of movement with the body portion of the spout extending transversely of the channel, means for severing said complete spout from said strip after said spout has been located in said channel, and means for conveying the severed spouts in succession through the channel to a predetermined point, the last-named means comprising a ram whose normal position is behind a spout when the latter is in said channel, said ram having a dog pivotally mounted thereon and provided with a finger which in one position will hook over the upper end of said body portion when the ram is in said normal position, means to actuate said dog in one direction to disengage said spout upon movement of said ram in the direction to push said spout, and means to return said dog to its first mentioned position upon return of said ram to the normal position of the ram.

12. A machine for mounting a pouring spout in a wall of a container having an open end, comprising a frame providing a spout-inserting station, means for moving separately and in succession to and from said station a plurality of containers each having a predetermined zone through which a portion of a spout is to be inserted, said means including a horizontal conveyor continuously movable in a straight path past and in juxtaposition to said station for moving said containers in a predetermined path in file formation to a point at one side of said station, apparatus between said conveyor and said station successively to divert each container from said conveyor, hold the container momentarily at said station for insertion of the spout and then move the container away from said station and onto said conveyor at the opposite side of said station, mechanism at said station for mounting a spout in said predetermined zone of the container while the container is stationary including a ram at the outer side of said wall for pushing a spout to insert said portion of the spout through said zone of said wall while said container is stationary at said station, an anvil, and means for moving said anvil into said container after the container has become stationary at said station and for retracting the anvil from said container before the container leaves said station, said means momentarily holding said anvil in close juxtaposition to the inner side of said zone to support said zone under the thrust of said ram during the insertion of said spout.

13. A machine for mounting a pouring spout in a wall of a container having an open end, comprising a frame providing a spout-inserting station, mechanism at said station including a ram for pushing a portion of a spout through said zone of the container, means for moving separately and in succession to and from said station a plurality of containers each having a predetermined zone through which a portion of a spout is to be inserted, said means including a horizontal movable conveyor having portions extending respectively from a point at one side of the station to the station and from the station to a point at the other side of the station, apparatus to divert the containers in succession from the first-mentioned portion of the conveyor, hold the container momentarily at the station for insertion of the spout, and then cause movement of the container away from the station to the second-mentioned conveyor portion, said apparatus comprising a transfer device intermittently rotatable above the conveyor and formed to engage the containers singly and to move them from the conveyor to the station and from the station onto the conveyor, and a table at the station below said ram, said containers being gravitationally frictionally supported on the conveyor and the transfer device having circumferentially spaced notches to receive a container when a notch is aligned with the first-mentioned conveyor portion and to release a container when the notch is aligned with the second-mentioned conveyor portion, said transfer device upon rotation thereof sliding the containers in succession from the first-mentioned conveyor portion onto the table and from the table onto the second-mentioned conveyor portion.

References Cited in the file of this patent

UNITED STATES PATENTS

| | | |
|---|---|---|
| 1,300,406 | Johnson et al. | Apr. 15, 1919 |
| 2,216,733 | Brucker | Oct. 8, 1940 |
| 2,223,480 | Darling | Dec. 3, 1940 |
| 2,270,300 | Hothersall | Jan. 20, 1942 |
| 2,589,769 | Brucker | Mar. 18, 1952 |
| 2,602,533 | Bruce | July 8, 1952 |